Jan. 23, 1973 R. J. McNAIR 3,713,025

PHASE SLIP CORRECTOR MEANS AND METHOD FOR SYNCHRONIZATION OF PSEUDORANDOM GENERATING MEANS IN MULTISTATION NETWORKS

Original Filed May 20, 1965 3 Sheets-Sheet 1

INVENTOR.
ROBERT J. McNAIR

BY [signature]

ATTORNEY.

INVENTOR.
ROBERT J. McNAIR
BY Charles M. Hogan
ATTORNEY.

INVENTOR.
ROBERT J. McNAIR
BY
[signature]
ATTORNEY.

United States Patent Office 3,713,025
Patented Jan. 23, 1973

1 2

3,713,025

PHASE SLIP CORRECTOR MEANS AND METHOD FOR SYNCHRONIZATION OF PSEUDORANDOM GENERATING MEANS IN MULTISTATION NETWORKS

Robert J. McNair, Cincinnati, Ohio, assignor to Avco Corporation, Cincinnati, Ohio Continuation of abandoned application Ser. No. 656,750, July 28, 1967, which is a division of application Ser. No. 457,345, May 20, 1965, now Patent No. 3,350,644, dated Oct. 31, 1967. This application Dec. 4, 1969, Ser. No. 882,282
The portion of the term of the patent subsequent to Oct. 30, 1984, has been disclaimed
Int. Cl. H04h 3/00
U.S. Cl. 325—58 1 Claim

ABSTRACT OF THE DISCLOSURE

In certain two-way communications systems involving a multiplicity of stations, pseudorandom sequence generators are used to code mark-space symbols transmitted by wide band radio frequency waves. The data transmitted are encoded by multiplexing the information with the output of a pseudorandom sequence generator. One such generator is provided at each station for both transmission and reception. Assuming the designation of a particular station as Control Central, the prior art shows arrangements for so synchronizing the various pseudorandom sequence generators so that the sequence provided at any outlying station which is receiving will lag, in real time, behind that generated and used for transmission at Control Central, by an amount proportional to signal-travel time, i.e., the distance between the stations. However, assuming such synchronization, systemwise, there is need to make suitable adjustments to permit a given outlying station to transmit back to Control Central. Two-way communication between outlying stations complicates the problem. The invention herein disclosed solves the problem by synchronizing a pseudorandom sequence generator at Control Central with principal reference outputs of pseudorandom generating means at each outlying station. Such generating means comprises a pseudorandom generator per se and a delay line providing a principal reference sequence. The delay line is tapped to provide access to any one of a plurality of time-advanced sequences. When it is desired to transmit back to Control Central, a predetermined time-advance sequence is employed. Other time sequences are used for communication with other outlying stations.

The present invention is a continuation of United States patent application of the present inventor, Robert J. McNair, Ser. No. 656,750, filed July 28, 1967, and now abandoned, entitled "Slip Corrector Means and Method for Synchronization of Pseudo-Random Generating Means in Multistation Networks" which is a division of the United States patent application of the present inventor, Rober J. McNair, Ser. No. 457,345, filed in the United States May 20, 1965, now Pat. No. 3,350,644, entitled "Slip Corrector Means and Method for Multistation Networks" and assigned to Avco Corporation, the assignee of the present application and invention.

The present invention relates to slip correction in synchronized radio communcations networks technology and is of particular utility in side band communications systems employing two-way communication among a plurality of stations greater than two in number, specifically those systems in which pseudorandom sequence generators are used to code Mark-Space symbols transmitted via wideband radio frequency waves.

The transmission of data over networks of the type mentioned above requires that all stations in the network have their pseudorandom sequence generating means properly synchronized, the one to the other, so that each continuously operates at the proper point in the code sequence.

The invention herein disclosed applies particularly to a radio network wherein the data transmitted by the individual stations are encoded by multiplexing the information with the output of pseudorandom sequence generating means. The invention maintains time synchronization of all of the pseudorandom sequence generating means used by the stations in the communications network.

The principal object of the present invention is to provide slip corrector means which makes such synchronization practical.

Figure 1A:
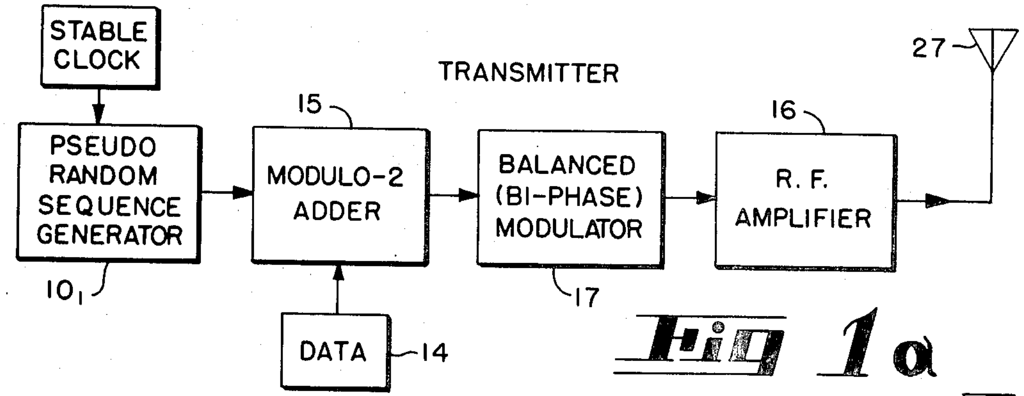
Figure 1B:
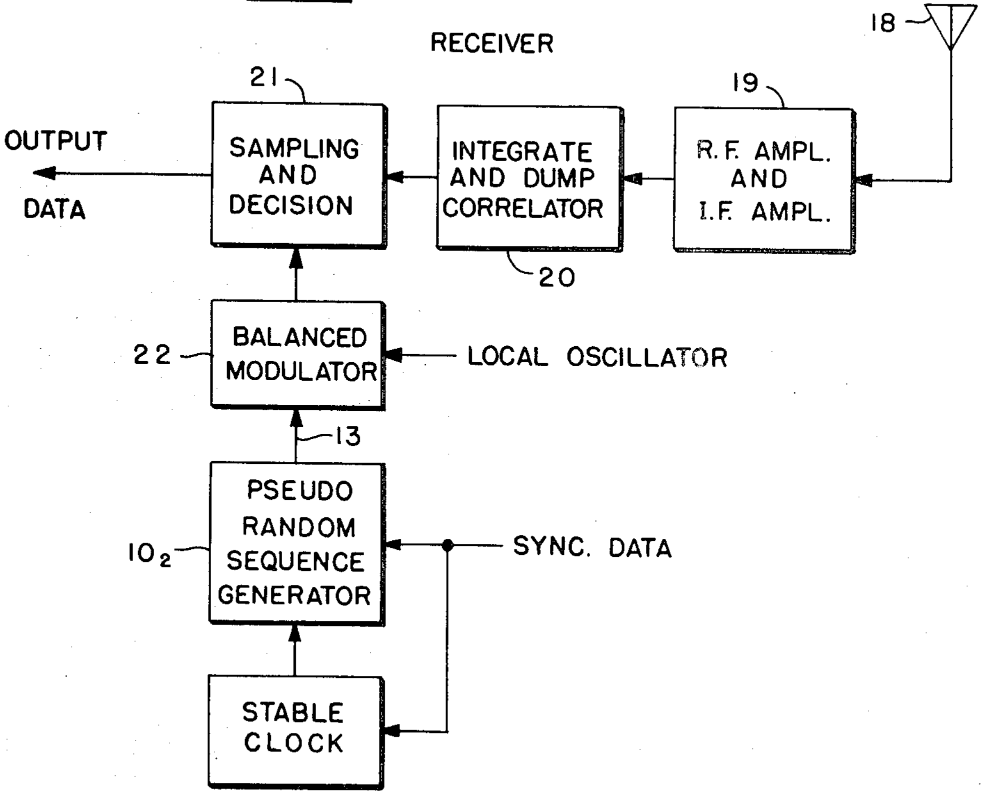
Figure 2:
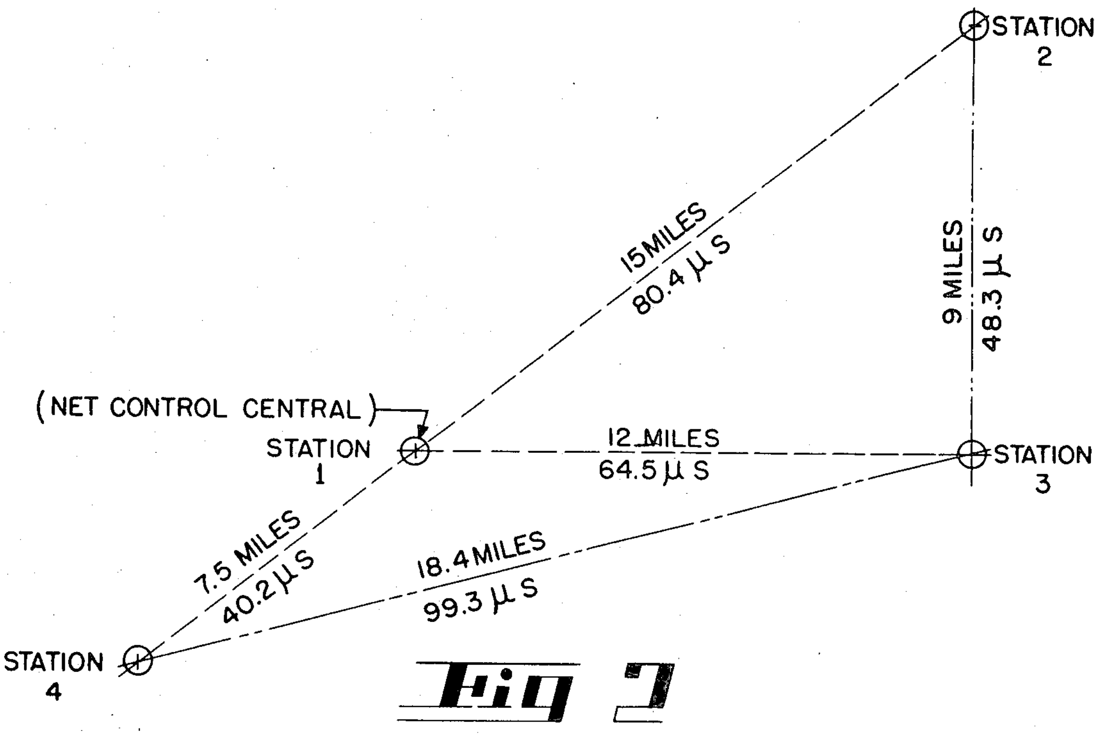

For a better understanding of the present invention, together with other and further objects, advantages and capabilities thereof, reference is made to the following description of the appended drawings, in which:

FIG. 1*a* is a block diagram, in functional form, of the transmitting equipment included at each station in a wideband network of the type under consideration;

FIG. 1*b* is a block diagram, in functional form, of the receiving equipment at each such station;

FIG. 2 is a map of a multistation network including a Control Central station and a plurality of other stations hereinafter collectively referred to as "outlying stations;"

Figure 3:
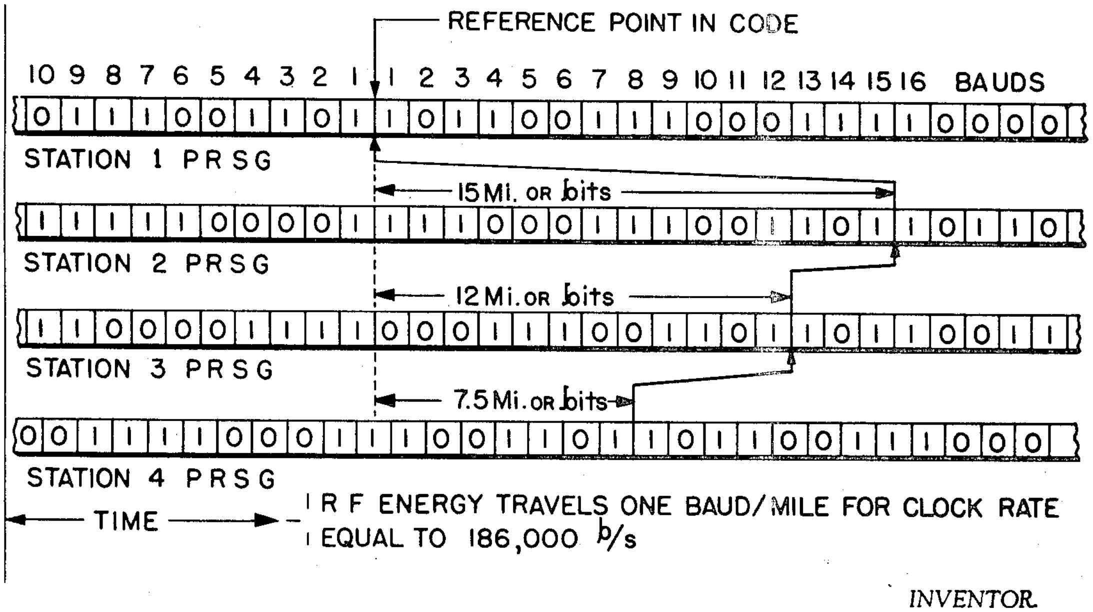
Figure 4:
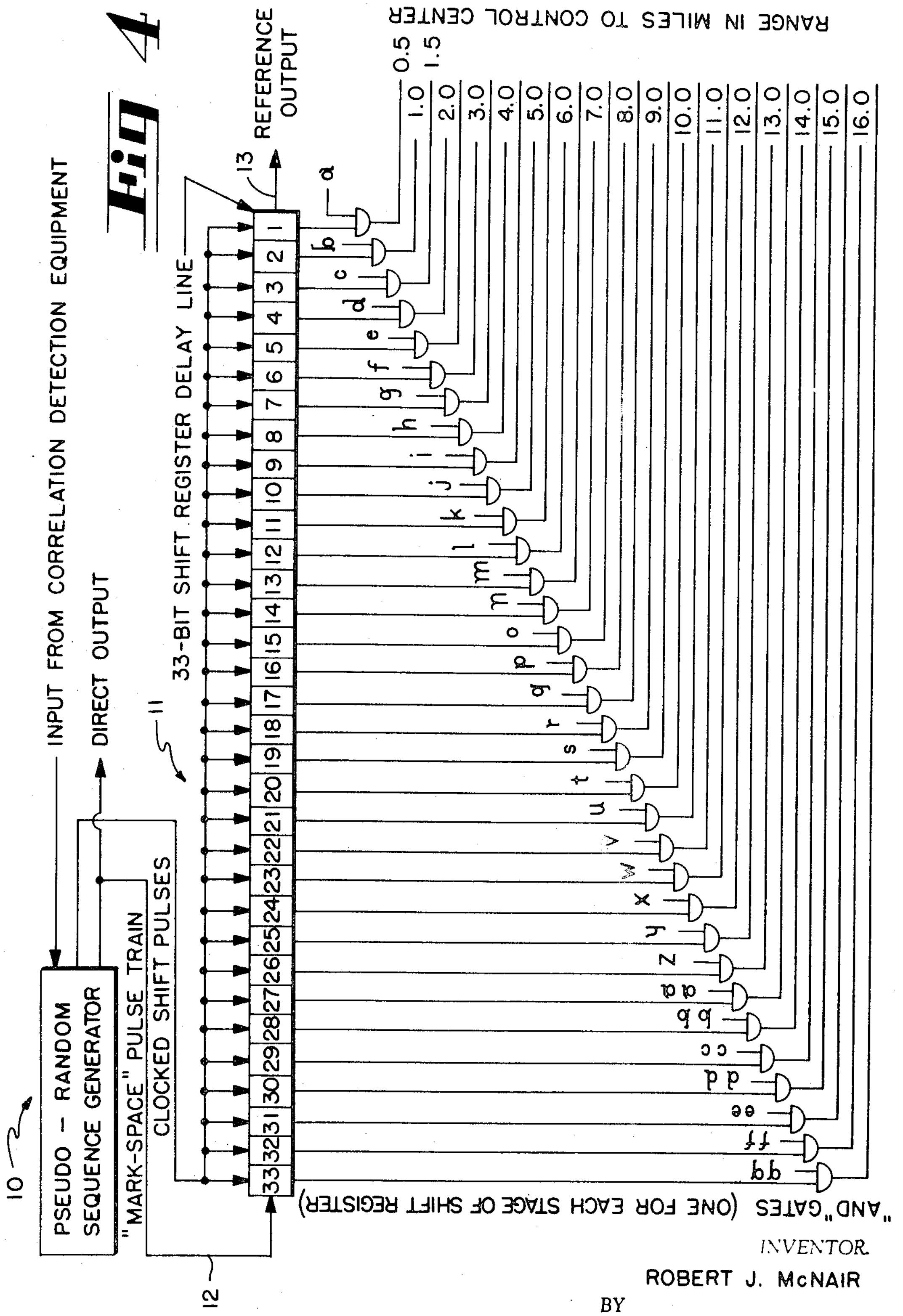

FIG. 3 is a series of block diagrams showing the time lags between transmission of a given bit at the Control Central station and receptions of the same bit at the several outlying stations; and FIG. 4 is a schematic diagram, generally in block form, of a slip corrector device in accordance with the invention, this slip corrector having what is hereinafter referred to as a "principal reference output" and a plurality of "selected time advanced outputs" provided for reasons hereinafter explained. Each outlying station uses the combination of a pseudorandom generator and a slip corrector device in lieu of a simple pseudorandom sequence generator.

As indicated, there is shown in FIG. 2 a system of several communications stations, each capable of transmission and reception. It is important to note that at any one station, both the transmitter and the receiver employ a common pseudorandom sequence generator; that is, one such generator is provided at each station. Assuming that station No. 1 is the Control Central station, one of the objectives which the invention seeks to accomplish is to synchronize the outlying stations with the Control Central station in such manner that, when one of the outlying stations transmits back to the Control Central station, the received sequence at the Control Central station is in precise step with the pseudorandom sequence generator at that Control Central station. Another and more rigorous objective will be described following the discussion of FIG. 3.

Since all of the outlying stations Nos. 2, 3 and 4 are displaced from the Control Central station No. 1, by various distances, the first of these desired objectives is accomplished by providing a compensating selected time-advanced output ahead of the principal reference output in each of the pseudorandom sequence generating means at the outlying stations for use when such stations are operating as a transmitter. The magnitude of the time advance of such sequence transmission at any outlying station is a function of its distance from the Control Central station. For example, at station No. 2 the magnitude of the time advance of the pseudorandom sequence transmitted to station No. 1 is 30 bits, for reasons discussed below. When the transmission is from station No. 3 to the Control Central station No. 1, that magnitude is 24 bits. When the transmission is from station No. 4 to the Control Central station No. 1, the displacement is 15 bits. The employment of such time advanced sequences permits transmit-receive two-way communication between Control Central station No. 1 and any of the outlying stations. Expressing these points more succinctly, the time advanced pseudorandom sequence used for transmitting messages from station No. 2 to station No. 1 will, on receipt, be in exact step with the sequence originally generated and used for modulation at station No. 1. The time-advanced sequences as received from station No. 3 or 4 will likewise be in step with the sequence as generated at station No. 1, notwithstanding the variance in the signal-travel distances involved. The distance factor is compensated for by selecting the magnitude of time advance at each outlying station, depending on its distance from station No. 1.

The invention provides, at each of the outlying stations, a modified pseudorandom sequence generating means which comprises not only a pseudorandom sequence generator but also a slip corrector in the form of a shift register delay line into which this sequence generator works. The output of said delay line constitutes the principal reference output and the plurality of tapped outputs at various time-advanced points along that delay line constitute the selected time-advanced outputs from which the time-advanced sequences are taken, as desired, when transmitting. Each pulse coming from the pseudorandom sequence generator proper into the delay line causes all of the "Mark-Space" pulses in the delay line to advance one stage, with polarity preserved. That is, the pulse code stream coming out of the principal reference output of the delay line at the outlying station will be the same as the one which originally came from the pseudorandom sequence generator proper at the outlying station, but delayed in time by an amount equal to the number of stages in the delay line multiplied by the clock rate of said pulses. In other words, receivers at the outlying stations adjust their pseudorandom sequence generating means so that the principal reference output from each delay line matches the incoming signal wave train from the central control transmitter at station No. 1. That is, when receiving at an outlying station, it is the sequence taken from the reference output that is in step with the sequence received from station No. 1. When an outlying station is transmitting to station No. 1, it is the time advanced output of the slip corrector device that is brought into precise synchronization with the sequence generator at station No. 1.

With the pseudorandom generating means synchronized, it is possible for any outlying station to transmit a properly coded message back to the Control Central station. The outlying station does this by tapping off the pseudorandom code sequence at that stage in the shift register delay line which represents the time required for the R.F. energy to traverse both ways along the path separating the two stations. This is possible since each successive stage of the shift register prior to the final represents a discrete advance in the time of occurrence of a specific mark or space in the sequence.

In the following discussion a certain baud rate is assumed for purposes of illustration and certain distances between stations are arbitrarily specified, but it will be understood that the invention is not limited to the parameters so selected.

The radio frequency energy traveling from one station to another travels at a speed of approximately 186,000 miles/second or stated another way, 5.37 microseconds are required for the R.F. signal to travel a statute mile. For the station separation shown in FIG. 2, the delay time between transmission and receipt of a message will be as follows (computed to the nearest tenth microsecond):

| Between stations Nos.— | Microseconds |
|---|---|
| **1** and **2** | 80.4 |
| **1** and **3** | 64.5 |
| **1** and **4** | 40.2 |
| **2** and **3** | 48.3 |
| **2** and **4** | 120.6 |
| **3** and **4** | 99.3 |

Next, assume that the clock rate of the pseudorandom sequence generator is 186,000 bits per second. This bit or baud rate gives an on-time for each binary bit of 5.37 microseconds. Hence, as regards the signal radiated from a transmitter, the leading edge of one of the binary bits making up the pseudorandom sequence will have traveled just a mile when that baud period ends at the transmitter.

For this signaling rate, the four-station network shown in FIG. 2 will synchronize as follows when a message is transmitted by station No. 1, the Control Central. The principal reference output of the pseudorandom sequence generating means (FIG. 4) of station No. 2 will, by means of correlation detection or some other equally effective technique, be brought into synchronization with the data wave train as received from station No. 1. Computed on the basis of absolute time, the principal reference output of the random sequence generating means (FIG. 4) of station No. 2 will be providing a code sequence which is delayed 80.4 microseconds relative to that of station No. 1 since it takes that long for the R.F. energy to arrive. Taking into account the lengths of the R.F. paths, the principal reference output of the sequence generating means (FIG. 4) of station No. 3 will operate 64.5 microseconds behind the pseudorandom sequence generator at station No. 1 while the principal reference output of the sequence generating means (FIG. 4) at station No. 4 will operate 40.2 microseconds behind that of station No. 1.

FIG. 3 depicts the manner in which the outputs of the sequence generator of station No. 1 and the principal reference outputs of the pseudorandom sequence generating systems of the other stations will synchronize for the case where station No. 1 provides the transmitted signal train with which the other stations are to be synchronized. On the basis of absolute time the baud signal trains at stations Nos. 2, 3 and 4 will be out of step with the basic wave train of station No. 1 by amounts directly proportional to the respective distances between the transmitter station No. 1 and the outlying receiving stations. The time lags between the first or basic code sequence used for modulation at station No. 1 and the primary reference sequences used for demodulation at the other station are as illustrated in FIG. 3.

The description of FIG. 3 shows the time conditions which prevail when the principal reference outputs of the pseudorandom sequence generating means of the outlying stations are synchronized onto signals received from Control Central station No. 1, assuming a baud rate of 186,000 per second. In the top line of the figure there is shown a code or first pseudorandom sequence as generated and transmitted by the Control Central station. This discussion assumes that Control Central has just generated the random binary sequence "001101." The second line shows that 15 bits later in time station No. 2 will receive the code 001101. The third line shows that 12 bits later in time station No. 3 receives the code. The fourth line shows that 7.5 bits later in time, again with respect to station No. 1, station No. 4 receives the code. In each instance the respective time delay is due to travel time of the R.F. signals. These are the conditions which prevail when the Control Central station is transmitting and the outlying stations are receiving, the principal reference outputs of the pseudorandom generating means (FIG. 4) being used for demodulation and being synchronized with and appropriately time displaced with respect to the output of the pseudorandom sequence generator, used for modulation, at transmitting station No. 1.

The equipment provided according to the invention, as used in each outlying station, and shown in FIG. 4 consists of pseudorandom sequence generator 10, a shift register delay line 11, a series of gating circuits *a–z* and *aa–gg* (one gate for each stage of the shift register), and a suitable switching network (not shown). Operation is as follows. The pulse output from the pseudorandom sequence generator along line 12 consists of a train of "mark-space" pulses. This train of pulses comprises the input to the shift register delay line 11. As the end of each pulse period is reached, all pulses stored in the register are shifted to the right one interval. Thus, for the example previously used, wherein the bit rate from the pseudorandom generator is 186,000 bauds/second, shift pulses occur each 5.37 microseconds. For ease of explanation, assume that the shift register delay line has 33 stages as shown in FIG. 4. This means that it would not be until the thirty-fourth pulse interval (one+length of delay register) that a specific "mark or space" pulse generated in the pseudorandom sequence generator 10 will appear at the principal reference output 13 of the shift register delay line. Thus, the principal reference output of the shift register delay line is an exact duplicate of the output of the pseudorandom sequence generator 10 but delayed in time by an amount equal to the number of stages in the register times the clock rate of the pulses. For the example used this amounts to thirty-three stages times 5.37 microsecond clock rate or 177.22 microseconds. Further, an identical time-advanced pseudorandom sequence is available at any of stages Nos. 1–33 along the shift register delay line. Progressing from right to left along the delay line shown in FIG. 4, the code sequence available from a particular stage of the register progressively advances as a function of baud time of occurrence. Using "and" gates as shown in FIG. 4 specific points in the psuedorandom code train can be selected and these points will represent advance in time relative to the reference output. I.e., selected time-advanced sequences, for transmitting, can be gated out of any of the "and" gates *a–z* and *aa–gg*.

Suppose now that it is desired to set u the four-station communications network shown in FIG. 2. To establish initial synchronization of the network, station No. 1, the Control Central, transmits a synchronizing burst of sufficient length so that the principal reference outputs of the pseudorandom pulse sequence generating means in the receiving equipment at stations Nos. 2, 3 and 4 can be brought into synchronization with that of station No. 1. It is not the direct outputs of the pseudorandom sequence generators at stations Nos. 2, 3 and 4 which are brought into time synchronization with the received signal, but, represent advances in time relative to the reference output. put pseudorandom sequence available at the output of the shift register delay line which is used for demodulation and made correlate with the received signal train. Thus, for the conditions previously assumed in the example, the pseudorandom sequence generating means at stations Nos. 2, 3 and 4 will be so arranged as to make the principal reference outputs from their shift register delay lines appear as shown in FIG. 3 when compared one to the other on an absolute time basis.

Describing FIG. 4 structurally, it comprises a pseudorandom sequence generator proper 10, having a "Mark-Space" pulse output line 12. In FIG. 4 there is also shown the 33 bit shift register delay line 11 having an input coupled to line 12 and also having a principal reference output 13. It is the principal reference sequence or output at 13, at each outlying receiver, which is used for demodulation and synchronized with the pseudorandom sequence generator at the transmitter of the Control Central station No. 1 when station No. 1 is transmitting. In order to provide for the time advanced sequences utilized for modulation, in accordance with the invention, when transmission is back to station No. 1, or, as will be shown, when it is between outlying stations, "and" gates designated *a–z* and *aa–gg* are individually provided at each stage of the delay line, so that the desired time advance is selected in accordance with range, as has been indicated.

The particulars of the transmitter and receiver functionally shown in FIGS. 1*a* and 1*b* are not important here and the functional block diagrams there shown simply indicate a type of system equipment with which the slip corrector in accordance with the invention is of utility. A message or other intelligence to be communicated is furnished by a source of electronic data 14 and applied to the input of a modulo-2 adder 15 which also receives an input from a pseudorandom sequence generator $\mathbf{10_1}$,* which is timed by a stable clock. The output of the modulo adder is modulated onto the radio frequency wave output of a radio frequency amplifier 16, via a balanced modulator 17 and the composite signal is radiated out of the transmitter, for example, by station No 1 transmitting by an antenna 27. At the outlying station, such as station No. 2, the signal is intercepted by a receiving antenna 18, suitably amplified and heterodyned down in frequency by network 19, and processed in an integrator and dump correlator 20 whose output is applied to a sampling and decision network 21.

The pseudorandom sequence generating equipment at the receiver is numbered $\mathbf{10_2}$ to indicate its relationship to station No. 2 and FIG. 4 and its output is coupled, via line 13 and a balanced modulator 22 to the sampling and decision network 21. Again the pseudorandom sequence generating means $\mathbf{10_2}$ is clock-controlled. Now when station No. 2 is functioning as a transmitter, then the time-advanced outputs of the equipment illustrated in FIG. 4 are utilized, rather than the random sequence generator principal reference output.

It will be understood of course that there is only one random sequence generator at each station and switching networks for encircuiting it as desired are well known to those skilled in the invention. While the description of FIG. 1 is on the footing that the transmitting equipment as at station No. 1 and the receiving equipment at station No. 2, this being done to facilitate the description of operation, it will be understood that at each station there are both transmitting and receiving equipments functionally along the lines shown in FIGS. 1*a* and 1*b*, with a common pseudorandom sequence generator.

With all stations in the FIG. 2 network now synchronized to the pseudorandom sequence generator of station No. 1, the Control Central, two-way communications can begin. It will be undertaken as follows. Suppose station No. 2 transmits a message to station No. 1. Knowing the range to station No. 1 (15 miles for the example used) the selected pseudorandom code sequence used for modulation at station No. 2 is taken from the shift register delay line at that stage or gate which represents a time advance in relation to the primary reference sequence equal to the round trip delay from station No. 1 to station No. 2 and return. The reason for this is that the primary reference sequence, employed for demodulation at station No. 2, lags behind the sequence generator at station No. 1 by the single trip. In order to make a selected sequence, used for modulation at station No. 2, "arrive" at station No. 1 in step with the sequence generator at station No. 1, the selected sequence must lead the primary reference sequence by the amount of this lag plus the time for a signal trip from station No. 2 to station No. 1. For the example used, this round-trip delay is 30 miles times 5.37 microsec./mile. Stage 30 in the shift register provides the required time advance. This point in the shift register 11 is available through "and" gate (*dd*) (see FIG. 4) and station No. 2 data encoded through multiplexing with the time-advanced pseudorandom sequence available at stage 30 in the shift

*The subscript $_1$ simply indicates location at station No. 1.

register delay line will be in the proper time phase for immediate detection at station No. 1. Similarly, for the example used, station No. 3 would transmit to station No. 1 by tapping its shift register delay line at stage 24 (see FIG. 4) which can be reached through "and" gate (*x*), and station No. 4 would transmit to station No. 1 by tapping off stage 15 of its shift register delay line reached via "and" gate (*o*). In all cases, then, tapping off the shift register delay line at that stage of the register which represents the time advance in code sequence needed to account for the two-way travel time of the R.F. energy will properly synchronize the data being sent back to the Control Central station No. 1 from the outlying stations, i.e., the selected time-advanced sequences are used.

In the case of transmission from station No. 2 to station No. 1, the selected time advance is equal to twice the signal travel time between stations. Using a more general expression, the time advance is really the sum of signal travel time between stations and the time differential between the sequences used for demodulation at the transmitting and receiving stations when they are synchronized with station No. 1. This general rule will be demonstrated below.

After initial synchronization of the network a problem arises if there are more than two stations which transmit data. For example, assume that stations Nos. 2 and 3 of the network shown in FIG. 2 wish to carry on two-way communications subsequent to synchronization as shown in FIG. 3. When station No. 2 transmitter comes on, its R.F. energy must travel 9 miles to station No. 3, taking 48.3 microseconds. With a clock rate of 186,000 b./s. this requires 9 baud times.

For the postulated situation, the receiving station No. 3 must theoretically slip the principal reference output of its pseudorandom sequence generating means back 12 bits to be in synchronism with the principal reference sequence of the transmitter at station No. 2, because the principal reference sequence at station No. 3 was originally three baud times ahead of the principal reference sequence at station No. 2 sequence (for receiving). Note that the theoretical requirement is for slippage at the receiver of station No. 3 relative to station No. 2. Assuming such slippage at the receiver of station No. 3, now suppose that station No. 3 desires to re-transmit to station No. 2. The principal reference sequence of the pseudorandom sequence generating means of receiving station No. 2 must then theoretically slip 6 bits behind that of station No. 3 in order to synchronize with the incoming message from station No. 3. Assuming slippage at the receivers and two-way message transfer between stations Nos. 2 and 3, both of these stations would soon be out of readily acquired synchronization range so far as any of the other stations in the network are concerned.

Now, in accordance with the invention, this problem is solved by an arrangement (FIG. 4) in which the required theoretical slippage is accomplished at the transmitters, not the receivers. It is accomplished by the reverse of slippage, i.e., by selected time advances at the transmitters, and it is accomplished while maintaining the principal reference outputs (i.e., on lines 13 at the outlying stations) in synchronism with the pseudorandom sequence generator at the Control Central station No. 1.

Again assume that station No. 2 wishes to communicate with station No. 3 (see FIG. 2). Selection of the proper tap (FIG. 4) on the shift register delay line at station No. 2 depends on knowledge of three things, range of each station from Control Central and range from each other. For the example shown in FIG. 2, these ranges are known to be 15 miles from station No. 1 to station No. 2, 12 miles from station No. 1 to station No. 3, and 9 miles from station No. 2 to station No. 3. Computing R.F. travel time over these ranges and knowing the clock rate of the pseudopulses shows that station No. 2 (see FIGS. 3 and 4) should transmit to station No. 3 using stage 12 of his shift register delay line which is reached via "and" gate (*l*). The time advance at stage 12 is the sum of 9 units and 3 units. The 9 units represent signal travel time for one trip. The 3 units represent time differential between the sequences used for demodulation at the transmitting and receiving stations, when they are synchronized with station No. 1, i.e., 15 minus 12. Similarly, station No. 3 should transmit to station No. 2 using stage 6 of his shift register delay line which is reached via "and" gate (*f*). The time advance at stage 6 is the sum of 9 units and minus 3 units. The minus 3 units represent 12 minus 15. This is a third application of the general rule.

It was indicated above that when station No. 2 is transmitting to station No. 3, the latter must theoretically slip its principal reference sequence back by 12 bits but this slippage is actually accomplished in accordance with the invention by a time advance of the effective operation of the pseudorandom sequence generating means at station No. 2. The sequence selected for transmission being advanced by 12 bits in time at station No. 2, relative to the principal reference sequence at station No. 2, arrives at station No. 3 in step with the principal reference pseudorandom sequence generated at station No. 3.

It was also indicated above that when station No. 3 then re-transmits to station No. 2, the latter must theoretically slip its sequence generating means 6 bits behind station No. 3. This requirement is met, in accordance with the invention, by a time advance of the effective operation of the sequence generating means at station No. 3. The selected sequence being advanced by 6 bits in time at station No. 3, relative to the principal reference at station No. 3 arrives at station No. 2 in step with the principal reference pseudorandom sequence generated at station No. 2.

In a similar fashion, it may be shown for the sample network used here that station No. 4 would transmit to station No. 3 using stage 14 on its shift register, whereas, station No. 3 would transmit to station No. 4 using stage 23 of its shift register.

Now assume that station No. 2 wishes to communicate with station No. 4 (see FIG. 2). Since a line connecting them passes through station No. 1, the Control Central, the proper tap on their respective shift register delay lines to use in communicating one with the other, assuming both have been initially synchronized by the Control Central, is for each to use the same tap used for transmitting to station No. 1, that is, station No. 2 uses stage 30, 30 is the sum of 22.5 plus (13 minus 7.5). When the transmission is from station No. 4, it uses stage 15. 15 is the sum of 22.5 plus (7.5 minus 15).

From the foregoing it will be seen that the invention functions in such manner as to cause:

(1) The principal reference sequence outputs of any and all pseudorandom sequence generating means at the outlying stations to be synchronized with the pseudorandom sequence generator at the Control Central station, when the outlying stations are receiving, in such manner as to time-lag behind the first or basic sequence at station No. 1 as a function of their respective distances from station No. 1.

(2) The selected time advanced outputs of each of the pseudorandom sequence generators at the outlying stations, when transmitting to station No. 1, to be in step, as received, with the pseudorandom sequence generator at Control Central station No. 1, the time advances being a function of double the respective distances between the outlying stations and Control Central station No. 1.

(3) The selected time advanced output of any of the pseudorandom sequence generating means at any transmitting outlying station to be displaced in time in such manner that the pseudo sequence received at another outlying station from such transmitting station is in step with the principal pseudorandom sequence of the outlying station which is receiving, the displacement in that event being a function of the distance between the transmitting and receiving stations plus (if the transmitting station is farther from station No. 1 than the receiving station) or minus (if the transmitting station is closer to station No. 1 than the receiving station) the lag already introduced between the primary reference sequences at transmitting and receiving stations by reason of the synchronization with the Control Central station.

Therefore it will be seen that what the invention does at any outlying station is to advance the transmitted sequence by an amount which is functionally related to two variables:

(1) The length of signal travel between the two stations involved, and (2) The algebraic difference between their relative distances with respect to the Control Central station.

With the network operating in this way all data come to its addressee in proper phase so that continuous time synchronization of all pseudorandom sequence generating means is maintained. The only criterion is that the range from one station to the other is known to an accuracy equatable to the clock rate of the pseudorandom sequence generator. For the example discussed the range accuracy requirement is 0.5 mile but this is not considered restrictive.

In the operational environment, range from one site to another can be measured with this same code slip corrector. Ranging is achieved as follows. One of the stations acts as master, sending out a synchronizing burst, utilizing the pseudorandom sequence present at the principal reference output of his code slip corrector.

The second station synchronizes its reference output pseudorandom sequence with the received wave train. He then transmits a like synchronizing burst back to the master station using an encoding sequence which is time locked to the pseudorandom sequence present at the principal reference output of his shift register delay line. The operator of the master station without changing his sequence generating means has only to sample the various taps on his shift register delay line until he finds a time-advanced sequence such that correlation is accomplished. The specific tap giving correlation provides immediate information as to the range between stations. Transmission of this information back over a radio line allows the second station to properly set its transmitting tap.

Other ranging means may be used. For example, if the station sites are fixed, surveyed range data are probably available. If the network stations are mobile or comprised of both fixed and mobile transceivers, it may be that data on present position are available from an inertial platform or other navigational aid.

The illustrative system here described to better explain the operation of the code slip corrector, is not intended to be restrictive. The code slip corrector is useful for maintaining time synchronization of all of the pseudorandom code generating means used in a radio network having any one of a wide variety of configurations. The clock rate of the generator and the maximum range expected between stations will determine the parameters of the shift register delay line and its associated gating circuits for a specific implementation. Further, data computers used for processing the station data may be programmed to automatically select, update, and switch in the proper tap on the shift register delay line whenever a particular station of the network is being addressed. Finally, it should be mentioned that no one station has to be the master station. Rather, for a random access network, any station can initiate a message and temporarily be the Control Central.

It will be understood that the two stable clocks illustrated in FIG. 1, for example, are locked in by synchronizing data provided by means known to the art and not shown herein. In the absence of lock-in, the clock at each receiver runs faster than the clock at the master transmitter at Control Central. This disclosure postulates synchronization of the clocks and provides novel means for maintaining system synchronization with respect to the generation of the pseudorandom sequences.

While the above discussion postulates that there is a simple pseudorandom sequence generator at the Control Central station No. 1, which generator has a principal reference output only, it is within the purview of the invention to provide at station No. 1 a pseudorandom sequence generator and a shift register slip corrector in accordance with the invention, thus permitting synchronized reception at station No. 1 from one of the outlying stations, should such outlying station be selected as the master station.

While there has been shown and described what is at present considered to be a preferred embodiment of the invention, it will be understood by those skilled in the art that various changes and modifications may be made therein without departing from the scope of the invention as described in the appended claim.

Having fully described the invention, I claim:

1. In a wide band radio transmission system, the combination of:

a first transmitter-receiver station having a first pseudorandom sequence generator;

a second transmitter-receiver station having a second pseudorandom sequence generator;

a tapped delay line coupled to the second pseudorandom sequence generator for providing a principal reference sequence employed as a synchronizing datum at the second station and delayed by a predetermined amount relative to the second pseudorandom sequence, and a plurality of discrete selectable time-advanced sequences which are delayed by intermediate amounts with respect to the second pseudorandom sequence and time-advanced with reference to the principal reference sequence;

the distance between the stations introducing a time lag between the first pseudorandom sequence and the principal reference sequence when the second station is synchronized to the first;

means modulated by a selected time-advanced sequence for transmitting signals from the second station to the first station;

and means demodulated by the first pseudorandom sequence for receiving signals at the first station;

the selected time-advanced sequence being in advance of the principal reference sequence by an amount equal to twice said time lag, which amount is equal to said lag plus the time of signal travel between said stations so that the second station can communicate with the first without going through slow correlation for every message.

References Cited

UNITED STATES PATENTS

| | | | |
|---|---|---|---|
| 2,521,721 | 9/1950 | Hoffman et al. | 343—179 |
| 3,305,636 | 2/1967 | Webb | 178—67 |
| 3,409,889 | 11/1968 | Graham | 343—7.5 |
| 3,351,859 | 11/1967 | Groth, Jr., et al. | 325—65 X |
| 3,453,592 | 7/1969 | Ishii et al. | 340—146.1 |

BENEDICT V. SAFOUREK, Primary Examiner

U.S. Cl. X.R.

178—69.5; 328—56

PO-1050
(5/69)

UNITED STATES PATENT OFFICE
CERTIFICATE OF CORRECTION

Patent No. 3,713,025 Dated January 23, 1973

Inventor(s) Robert J. McNair

It is certified that error appears in the above-identified patent and that said Letters Patent are hereby corrected as shown below:

Column 5, line 43, "to set u" should read --- to set up ---.

Column 5, lines 54 and 55 should read --- rather, in each instance it is the principal reference output pseudorandom sequence available at the output of the ---

Column 5, line 57, "and made correlate" should read --- and made to correlate ---.

Column 8, line 48, (13 minus 7.5) should read ---(15 minus 7.5) ---.

Signed and sealed this 13th day of November 1973.

(SEAL)
Attest:

EDWARD M.FLETCHER,JR.
Attesting Officer

RENE D. TEGTMEYER
Acting Commissioner of Patents